United States Patent [19]
Levesque

[11] Patent Number: 6,031,302
[45] Date of Patent: Feb. 29, 2000

[54] BATTERY MANAGEMENT SYSTEM WITH CURRENT MEASUREMENT ACROSS ON-RESISTANCE OF SEMICONDUCTOR CUTOUT SWITCH

[75] Inventor: Christian Levesque, Fountain Valley, Calif.

[73] Assignee: Conexant Systems, Inc., Newport Beach, Calif.

[21] Appl. No.: 08/940,630

[22] Filed: Sep. 30, 1997

[51] Int. Cl.[7] ................................................. H01H 35/00
[52] U.S. Cl. ......................... 307/130; 307/131; 307/126; 307/125; 320/132; 320/134
[58] Field of Search ..................... 307/116, 117, 307/125, 130, 131, 126; 320/148, 150, 162, 132, 134; 361/88, 93, 103

[56] References Cited

U.S. PATENT DOCUMENTS

| | | | |
|---|---|---|---|
| 3,568,043 | 3/1971 | Rabus | 307/237 |
| 4,068,332 | 1/1978 | Meyers et al. | 342/44 |
| 5,371,456 | 12/1994 | Brainard | 320/31 |
| 5,471,128 | 11/1995 | Patino et al. | 320/13 |
| 5,477,130 | 12/1995 | Hashimoto et al. | 320/49 |
| 5,539,298 | 7/1996 | Perkins et al. | 320/21 |
| 5,541,489 | 7/1996 | Dunstan | 320/2 |
| 5,565,759 | 10/1996 | Dunstan | 320/48 |
| 5,572,110 | 11/1996 | Dunstan | 320/30 |
| 5,578,391 | 11/1996 | Meyers et al. | 429/97 |
| 5,600,230 | 2/1997 | Dunstan | 320/48 |
| 5,637,413 | 6/1997 | Fernandez et al. | 320/31 |
| 5,648,715 | 7/1997 | Patino et al. | 320/22 |
| 5,684,663 | 11/1997 | Mitter | 351/106 |
| 5,731,685 | 3/1998 | Jones | 320/14 |
| 5,773,956 | 6/1998 | Wieczorek | 320/30 |
| 5,783,998 | 7/1998 | Nakajou et al. | 340/636 |
| 5,796,238 | 8/1998 | Hiratsuka et al. | 320/5 |
| 5,801,573 | 9/1998 | Kelly et al. | 327/434 |
| 5,811,895 | 9/1998 | Suzuki et al. | 307/125 |
| 5,867,008 | 2/1999 | Du et al. | 320/136 |

*Primary Examiner*—Jeffery Gaffin
*Assistant Examiner*—Peter Zura
*Attorney, Agent, or Firm*—Merchant & Gould

[57] ABSTRACT

An improved battery management circuit and system are disclosed. The improved battery management system relates to the type having at least one battery cell that is connected in a circuit with battery powered components, a current sensing resistance that is located in series within the circuit, voltage measurement circuitry that measures the voltage that develops across the current sensing resistance in proportion to the current flowing through the resistance, a cutout switch that is located in series within the circuit, and means for opening the cutout switch when the measured voltage is too high. The improvement is a single circuit element which functions as the current sensing resistance and as the cutout switch, the single circuit element having first and second electrodes and a control electrode that turns the first and second electrodes "on" and "off" and wherein the current sensing resistance is an on-resistance between the first and second electrodes.

24 Claims, 2 Drawing Sheets

BATTERY MANAGEMENT SYSTEM WITH CURRENT MEASUREMENT ACROSS ON-RESISTANCE OF SEMICONDUCTOR CUTOUT SWITCH

BACKGROUND OF THE INVENTION

1. Field of the Invention

The present invention relates generally to portable, battery powered devices and more particularly to a battery management system for such portable devices.

2. Description of Related Art

The proliferation of portable devices such as laptop computers, cordless phones, cellular phones, camcorders, and GPS receivers, to name but a few, has caused a correlated increase in the demand for battery pack performance. The consumer demand is constantly increasing for battery packs with higher capacity batteries, longer shelf life, smaller geometries, more usage time between charges, and more features—all at lower cost.

The foregoing demands have led the industry to use batteries of varying chemistries such as, for example, Nickel Cadmium (NiCd) batteries ("Nicads"), Lithium-Ion (Li-Ion) batteries ("Lithium cells"), and NiMH batteries. There is a need, therefore, for a battery management system that is suitable for use with different battery chemistries.

Battery management is of greater concern with some battery chemistries that with others. With Nicads, for example, repeatedly recharging the cells without fully depleting their energy storage will result in undesirable battery "memory" which reduces the capacity of the cells. It may be desirable, therefore, to provide a "fuel gauge" feature which indicates the available energy left based, for example, by estimating energy used since the last full charge. With Lithiums, on the other hand, it is important to protect them from overcurrent or overtemperature conditions because either may result in damage to the battery or worse, in an explosion causing harm to the batter powered components or the user.

A problem with many of the known battery management systems is that they require too many sensing and safety components (at relatively high component manufacturing and assembly cost) and they require that such components be placed in-line, or in series, with the batteries and the battery powered components (at relatively high energy cost where such components have internal resistances).

FIG. 1, for example, illustrates a conventional circuit involving a battery pack 10 that delivers power to battery powered components 70 via. The battery pack 10 contains one or more cells 20, as shown, and typically delivers power to the components 70 via terminals 22, 24 as part of a separable package. As is well known, any power loss between the battery 20 and the battery powered components 70 is simply wasted as heat. This type of loss is often called an IR loss in that it relates to a current I flowing through a resistance R. It is important, of course, to minimize this loss. This goal reduced power loss, however, is often in conflict with the need to provide safety or current sensing components.

FIG. 2 shows an example of a conventional safety component. In the case, the battery pack 10 includes a polyswitch 40—a well known safety device that is essentially a resettable fuse. The polyswitch is normally closed. It opens, however, in the event of overcurrent or overtemperature conditions so as to prevent damage to the battery 20 due, for example, to a short condition. Unfortunately, however, the polyswitch 40 has a characteristic resistance $R_{ps}$ even when it is closed. As explained above, the current I being drawn through the resistance $R_{ps}$ is simply wasted as heat.

FIG. 3 shows an example of a conventional current sensing component comprising a current sensing resistor 30 which has a small resistance value $R_{sense}$. The voltage which develops across the current sensing resistor 30, in compliance with Ohm's Law, is proportional to the current I flowing through the current sensing resistor 30. So long as $R_{sense}$ is accurately known, therefore, the voltage V can be measured and $I_{sense}$ can be derived from the equation $I_{sense}=V/R_{sense}$. In FIG. 3, the induced voltage V is figuratively shown as driving a voltage gauge, but as explained below somewhat with respect to FIG. 4, is normally provided to appropriate circuitry for performing a desired function. Again however, as explained above, the current I being drawn through an inline resistance such as the current sense resistance $R_{sense}$ is simply wasted as heat.

FIG. 4 is a schematic diagram of a battery pack 10 which incorporates the components of FIGS. 2 and 3 and more fully illustrates the use of the voltage V developed across the current sense resistance $R_{sense}$. As shown, the voltage $V_{sense}$ is delivered to an amplifier and polarity detector 32, is converted to a digital value by an A/D converter, and is passed to a CPU 36 which controls a safety switch 50 based on the current $I_{sense}$. In the conventional system, the safety switch 50 is normally closed, and the CPU 36 causes it to open and thereby protect the battery 20 if the current $I_{sense}$ passes a threshold level that is considered too high. The CPU 36 may also use perform other battery pack functions with the current $I_{sense}$, using it, for example, to derive a value for driving a "fuel gauge" 38 which indicates the available battery life. In either event, the battery pack of FIG. 4 suffers from unnecessary energy loss and high component cost associated with the fact that various resistances $R_{sense}$ and $R_{ps}$ are inline with the battery powered components 70.

There remains a need, therefore, for a battery management system which effectively protects the battery from damage with reduced component cost and reduced energy loss.

SUMMARY OF THE INVENTION

In a first aspect, the invention may be regarded as a an improved battery management system of the type having at least one battery cell that is connected in a circuit with battery powered components, a current sensing resistance that is located in series within the circuit, means for measuring the voltage that develops across the current sensing resistance in proportion to the current flowing through the resistance, a cutout switch that is located in series within the circuit, and means for opening the cutout switch when the measured voltage is too high. In this context, the improvement comprises a single circuit element which functions as the current sensing resistance and as the cutout switch, the single circuit element having first and second electrodes and a control electrode that turns the first and second electrodes "on" and "off" and wherein the current sensing resistance is an on-resistance between the first and second electrodes.

In a second aspect, the invention may be regarded as a battery management system including a battery cell and a semiconductor switch, wherein the battery cell has a first and a second terminal which form a circuit when connected to powered components and wherein the semiconductor switch includes a first electrode, a second electrode, and a control electrode. The semiconductor switch further includes an on-resistance between its first and second electrodes, wherein the first and second electrodes are in series in the circuit. The battery management system further includes a means for storing a value corresponding to the on-resistance; a means for measuring the voltage across the first and second electrodes; and a means for computing a value of the current flowing through the semiconductor switch based on the measured voltage and the stored on-resistance value. If the current flowing through the semiconductor switch is above a threshold value, a means for opening the semiconductor switch by signaling the control electrode of the semiconductor switch is engaged.

BRIEF DESCRIPTION OF THE DRAWINGS

The just summarized invention can be best understood with reference to the following description taken in view of the drawings of which:

FIG. 4 also includes a passive protection device in the form of a polyswitch 40 as shown in FIG. 2.

DETAILED DESCRIPTION OF THE PREFERRED EMBODIMENTS

Figure 5:
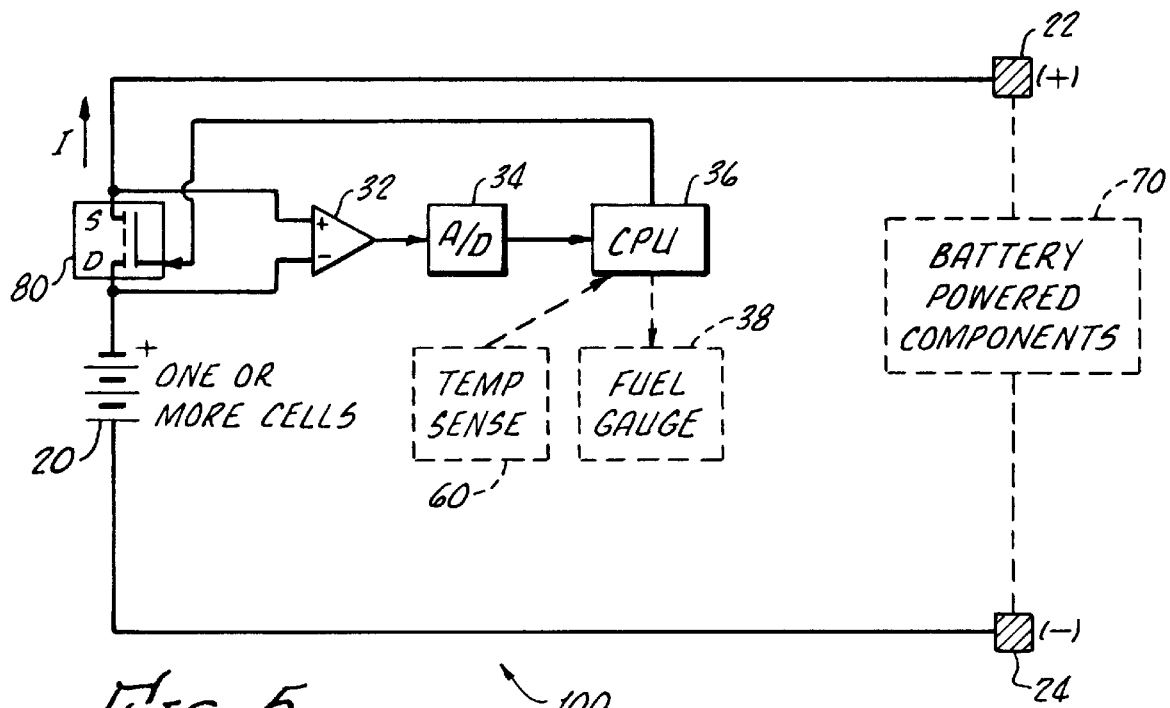
FIG. 5 is a schematic diagram of a battery powered circuit having a battery management system 100 according to the present invention wherein current is sensed across the on resistance $R_{DS-ON}$ of a semiconductor switch 80 that is controlled by a CPU 36 and optionally wherein a temperature sensing circuitry 60 provides battery temperature information to the CPU 36 in order to eliminate the need for an inline polyswitch.

FIG. 5 is a schematic diagram of a battery pack 100 which incorporates the battery management system of the present invention. As shown, the battery pack 100 includes one or more batteries or cells 20 which provide power to battery powered components 70 that may be found, for example, in a laptop computer, a cordless phone, a cellular phone, a camcorder, or a GPS receiver. Although the battery pack 100 may an integral component of the powered device, and not really a "pack" at all, it is normally detachable and distributes power via conductive terminals 22, 24 that make contact with mating terminals in the device (not shown).

Figure 1:
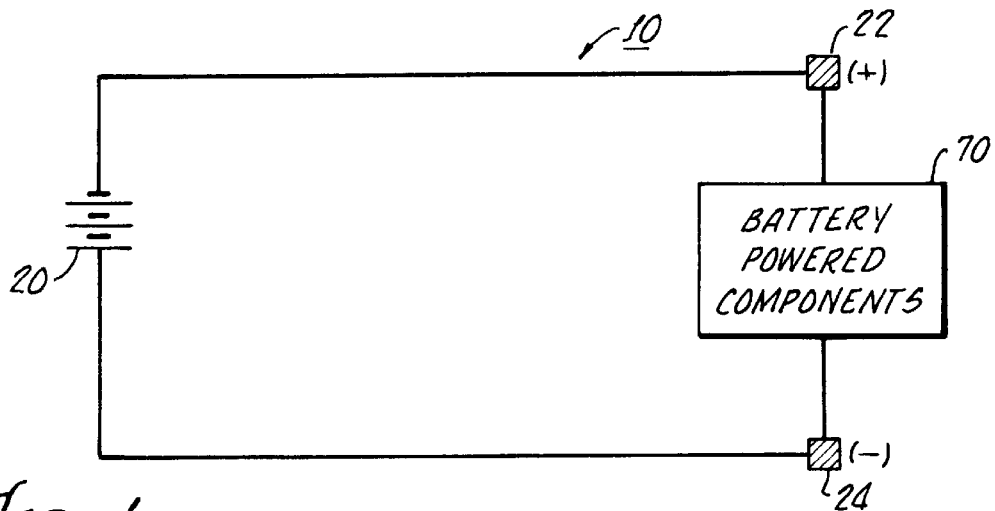
FIG. 1 is a schematic diagram of a conventional battery powered circuit involving a battery pack 10 and battery powered components 70.
Figure 2:
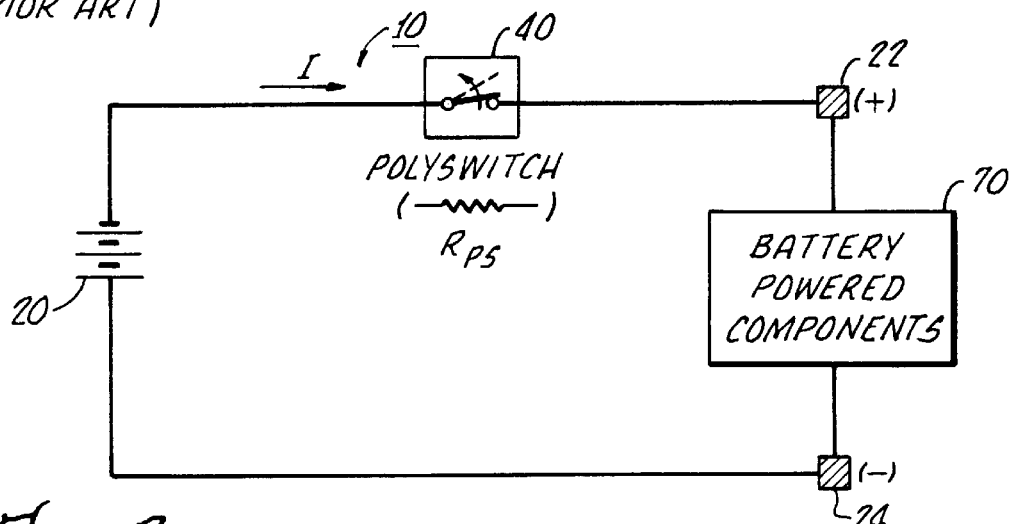
FIG. 2 is a schematic diagram of a conventional battery powered circuit wherein the battery pack 10 has an inline polyswitch or resettable fuse 40 for protecting against occasional overcurrent or overtemperature fault conditions, the polyswitch 40 having a characteristic resistance ($R_{ps}$) even when closed.
Figure 3:
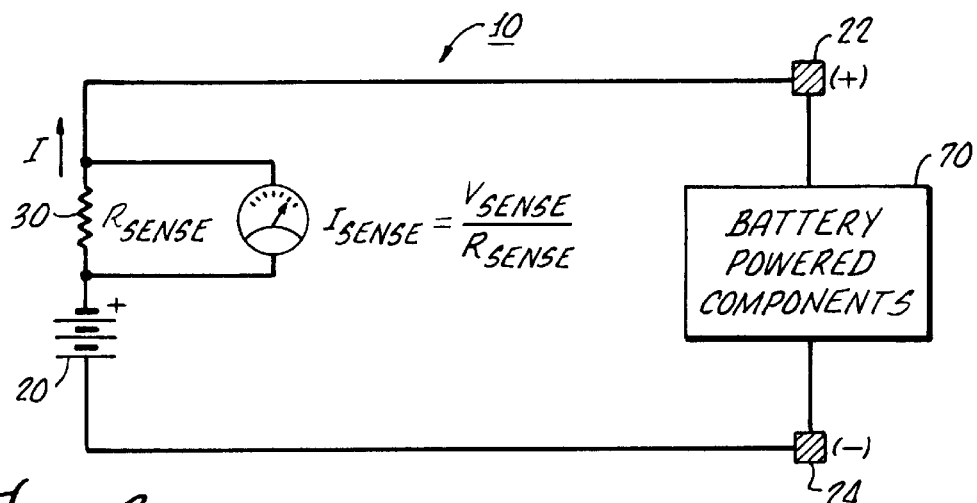
FIG. 3 is a schematic diagram of a conventional battery powered circuit wherein the battery pack 10 has an inline current sense resistor 30 with a small resistance value $R_I$.
Figure 4:
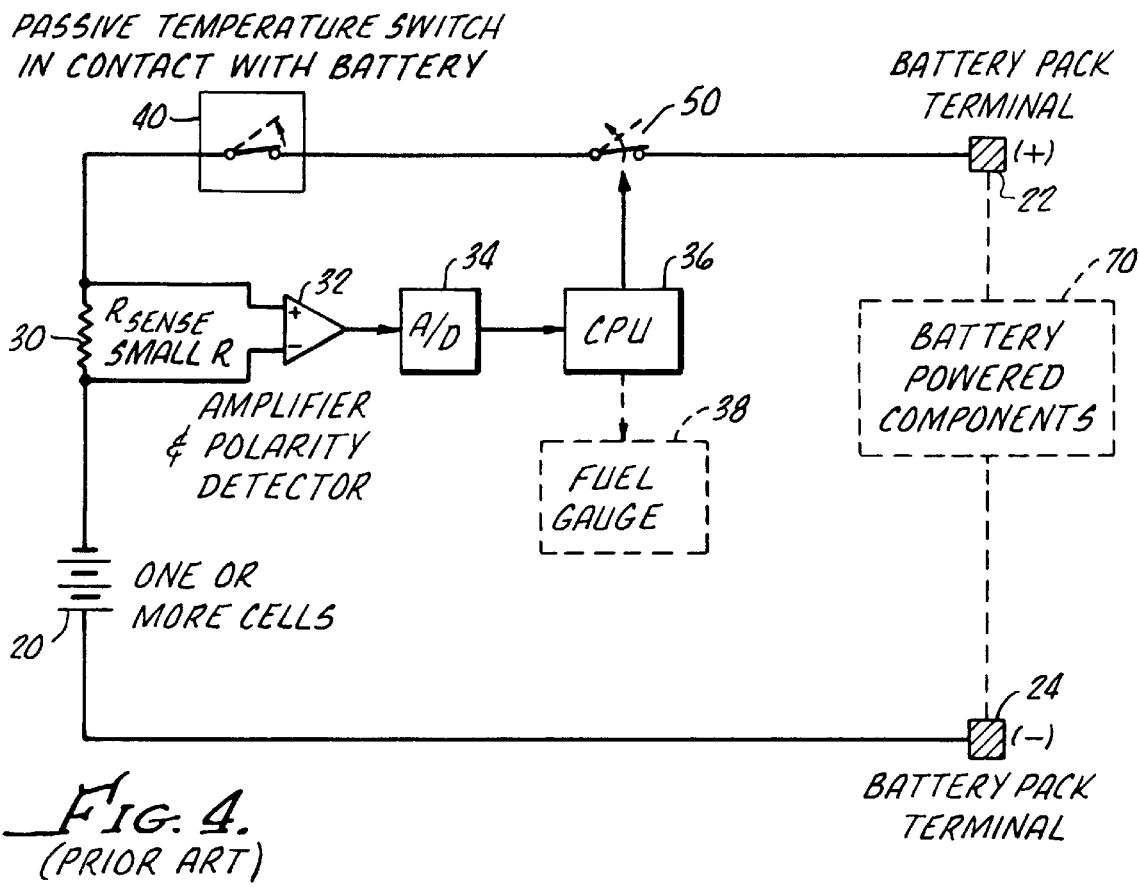
FIG. 4 is a schematic diagram of a conventional battery powered circuit wherein the battery pack 10 has an inline current sense resistor 30 and wherein the voltage which develops across the resistor 30 is input to an amplifier 32 and A/D converter 34 and then input to a CPU 36 for operating a safety switch 50 (normally a semiconductor switch such as a field effect transistor, aka a FET) and for performing other battery related functions such as updating a "fuel gauge" 38.

As shown in FIG. 5, a semiconductor switch 80 is located inline where the current sensing resistor 30 is found in the conventional systems of FIGS. 3 and 4. The semiconductor switch 80 is preferably a 3-terminal device having first and second electrodes and a control electrode. The device, for example, may be any suitable transistor of the types commonly referred to as a bipolar junction transistors or a field effect transistors. The important characteristics that makes a particular transistor suitable for use as a semiconductor switch 80 in this context is that it have a very low ON resistance the when turned "ON." The preferred semiconductor switch 80, as shown in FIG. 5, is a P-channel enhancement mode MOSFET which has a drain D, a source S, and a gate G. When the gate G is drive such that the MOSFET 80 is on, it has a very low, drain to source resistance $R_{DS-ON}$, typically in the range of 0.05 Ω to 0.1 Ω.

Provided that we know the value of the resistance $R_{DS-ON}$, in advance, we can measure the voltage across the semiconductor switch to determine the current draw in a manner similar to that accomplished with a discrete current sense resistor $R_{sense}$ as shown in FIGS. 3 and 4. Here, however, we have uniquely combined the separate safety switch 50 and current sense resistor $R_{sense}$ of FIG. 4 into a single element, thereby reducing the component count and the inline resistance that causes power loss.

More particularly, as shown in FIG. 5, the voltage developed across $R_{DS-ON}$ is delivered to an amplifier and polarity detector 32, converted to a digital value by an A/D converter, and passed to a CPU 36. Here, however, the CPU 36 does not control a separate safety switch, as in FIG. 4, but rather controls the gate of the semiconductor switch 80 across with the voltage was originally measured. Accordingly, if the current is too high, and the voltage developed across $R_{DS-ON}$ is proportionally too high as well, the CPU 36 detects this fact and "opens" the semiconductor switch 80 to prevent damage.

As indicated above, we need to know the resistance value $R_{DS-ON}$ of the semiconductor switch, in advance, in order to accurately sense the current I. This knowledge is preferably developed with a calibration process where appropriate equipment, readily available to those of ordinary skill in the art, measures the value of $R_{DS-ON}$ and then records that value for later use by, for example, "burning" it into an ASIC containing the battery management system by breaking particular filament fuses in a value register. By way of example, assuming that the value of $R_{DS-ON}$ has an expected range of ±5% due to manufacturing tolerances, the value may be recorded in an eight bit register where the upper four bits (MSB's) are always the same, but the lower four bits (LSB's)are set based on the calibration operation.

The preferred device, as shown in FIG. 5, also includes appropriate circuitry for providing a fuel gauge feature 38 based on the current draw that is proportional to the voltage detected across $R_{DS-ON}$. The implementation of such a fuel gauge is well known to those of ordinary skill in the art.

Finally, the preferred embodiment includes a temperature sensor 60 which provides temperature information from the surface of the batteries, from the ambient, or both, to the CPU 36 which, if the temperature is too high, opens the semiconductor switch 80 to prevent damage. This preferred approach provides for enhanced temperature sensing function and eliminates the separate polyswitch 40 ordinarily found in the prior art, as shown in FIG. 4, thereby further reducing the inline resistance by an amount equal to its characteristics resistance $R_{ps}$ and reducing unnecessary power loss.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A battery management system comprising:
   a battery cell having first and second terminals which form a circuit when connected to powered components;
   a semiconductor switch having a first electrode, a second electrode, and a control electrode, the semiconductor switch having an on-resistance between its first and second electrodes and the semiconductor switch located such that its first and second electrodes are in series in the circuit;
   means for storing a value corresponding to the on-resistance of the semiconductor switch;
   means for measuring the voltage that develops across the first and second electrodes of the semiconductor switch due to current flowing from the battery cell through the semiconductor switch;
   means for computing a value of the current flowing through the semiconductor switch based on the measured voltage and the stored on-resistance value; and
   means for opening the semiconductor switch by signaling the control electrode of the semiconductor switch if the current flowing through the semiconductor switch is above a threshold value.

2. The battery management system of claim 1 wherein the semiconductor switch is a 3-terminal device.

3. The battery management system of claim 2 wherein the semiconductor switch is a transistor.

4. The battery management system of claim 3 wherein the semiconductor switch is a field effect transistor.

5. The battery management system of claim 4 wherein the first, second, and control electrodes are a drain, a source, and a gate of the field effect transistor, respectively.

6. The battery management system of claim 1 wherein the measuring means comprises:
   an amplifier connected to the first and second electrodes of the semiconductor switch, the amplifier producing an output signal that is representative of the magnitude and polarity of the voltage across the semiconductor switch; and
   an A/D converter which receives the output of the amplifier and produces a digital value based thereon.

7. The battery management system of claim 6 wherein the computing means comprises a microprocessor which receives the digital value from the A/D converter.

8. The battery management system of claim 7 further comprising:
   means for sensing a temperature of the battery cell; and
   means for providing such temperature to the microprocessor, the microprocessor opening the semiconductor switch by signaling the control electrode of the semiconductor switch based on the sensed temperature in addition to the current flowing through the semiconductor switch.

9. The battery management system of claim 1 wherein the means for storing the value of the on-resistance comprises a digital register.

10. The battery management system of claim 9 wherein the digital register is an eight bit register.

11. The battery management system of claim 10 wherein the four most significant bits of the eight bit register are fixed and wherein the four least significant bits of the eight bit register are set on a calibration operation.

12. The battery management system of claim 9 wherein the digital register contains fusible-links for storing the value corresponding to the on-resistance.

13. The battery management system of claim 1 wherein the battery cell is contained in a separable battery pack.

14. The battery management system of claim 13 wherein the battery pack contains a plurality of battery cells.

15. An improved battery management system of the type having at least one battery cell that is connected in a circuit with battery powered components, a current sensing resistance that is located in series within the circuit, means for measuring the voltage that develops across the current sensing resistance in proportion to the current flowing through the resistance, a cutout switch that is located in series within the circuit, and means for opening the cutout switch when the measured voltage is too high, the improvement comprising a single circuit element which functions as the current sensing resistance and as the cutout switch, the single circuit element having first and second electrodes and a control electrode that turns the first and second electrodes "on" and "off" and wherein the current sensing resistance is an on-resistance between the first and second electrodes.

16. The improved battery management system of claim 15 wherein the single circuit element is a semiconductor switch.

17. The improved battery management system of claim 16 wherein the first, second, and control electrodes are a drain, a source, and a gate of the field effect transistor, respectively.

18. The improved battery management system of claim 15 wherein the single circuit element is a transistor.

19. The improved battery management system of claim 18 wherein the transistor is a field effect transistor.

20. The improved battery management system of claim 15 further comprising means for storing a value corresponding to the on-resistance of the single circuit element.

21. The battery management system of claim 20 wherein the means for storing the value of the on-resistance comprises a digital register.

22. The battery management system of claim 21 wherein the digital register is an eight bit register.

23. The battery management system of claim 22 wherein the four most significant bits of the eight bit register are fixed for a group of semiconductor switches and wherein the four least significant bits of the eight bit register are set based on a calibration operation for each individual semiconductor switch.

24. The battery management system of claim 21 wherein the digital register contains fusible-links for storing the value corresponding to the on-resistance.

* * * * *